United States Patent [19]

Cupp

[11] 3,869,707

[45] Mar. 4, 1975

[54] EVENT LOGGING SYSTEM USING A MAGNETIC RECORDER

[75] Inventor: Frederick B. Cupp, Fairport, N.Y.

[73] Assignee: Edmac Associates Inc., Rochester, N.Y.

[22] Filed: Sept. 10, 1973

[21] Appl. No.: 396,013

Related U.S. Application Data

[63] Continuation-in-part of Ser. No. 246,270, April 21, 1972, abandoned.

[52] U.S. Cl. .......................... 360/5, 360/6, 360/105

[51] Int. Cl. .......................................... G11b 5/00

[58] Field of Search ....... 346/74 MP; 360/5, 27, 32, 360/70, 105, 6

[56] References Cited

UNITED STATES PATENTS

| | | | |
|---|---|---|---|
| 3,395,385 | 7/1968 | Scoville | 360/5 |
| 3,493,676 | 2/1970 | Guerin | 360/5 |
| 3,495,835 | 2/1970 | Laa | 360/105 |
| 3,589,733 | 6/1971 | Piotrowski | 360/105 |
| 3,611,409 | 10/1971 | Glidden | 360/5 |

*Primary Examiner*—Stanley M. Urynowicz, Jr.
*Assistant Examiner*—Jay P. Lucas

[57] ABSTRACT

An event logging system for the unattended monitoring of physical or electrical events to provide a retrievable record of the time such events took place. In such system, signals from a variety of sensors are conditioned and applied through suitable electronic circuits to a magnetic tape medium having at least two tracks. The apparatus includes means for receiving a tape cartridge and a pivotally mounted arm having a recording head and pinch roller. When the pinch roller on the arm is pivoted into operative engagement with the cartridge, the circuits are energized. The energized circuits cause the recording of the relative time between events on the two tracks respectively.

A feature of this invention is the provision of a mechanical interlock to prevent the drive for the magnetic tape from being activated unless a tape cassette is properly aligned, thereby preventing damage to the system or inadvertent loss of data when operated by unskilled personnel.

7 Claims, 4 Drawing Figures

EVENT LOGGING SYSTEM USING A MAGNETIC RECORDER

CROSS REFERENCE TO RELATED APPLICATIONS

This application is a continuation-in-part of commonly assigned copending U.S. Pat. application Ser. No. 246,270, filed Apr. 21, 1972, entitled, AN EVENT LOGGING SYSTEM, in the name of Frederick B. Cupp, now abandoned.

BACKGROUND OF THE INVENTION

1. Field Of The Invention

The present invention relates to apparatus for recording signals on magnetic tape having an information content corresponding to the occurrence of events.

2. Description Of The Prior Art

In the continuous recording of events on magnetic tape, it is desirable to slowly but uniformly move a tape past a recording head. Tapes have been formed from materials which had excessive resilience or elasticity such that the motion of that tape past a head could be characterized by a "stick-slip-stick-slip" motion, not at all compatable with event recording requirements. Accordingly, the recording of events has been done manually or by a combination of semiautomatic and manual logging of the results. The recording of random events has often been accomplished more specifically by a number of methods such as, (1) mechanical counters attached to suitable electrical sensors, (2) in more complex devices punched paper tape, or (3) an electrically activated pen adapted to make an ink line graph on a paper chart. The first two methods have the distinct disadvantage that they do not include any means for identifying the time of occurrence of the event being recorded. The third mentioned method requires a visual analysis procedure which is time consuming and is not easily amenable to computerized techniques. Highway planners often utilized college students to sit at intersections and count the number of vehicles in each direction. An advance in this art is the use of mechanical counters operated by a pneumatic tube as the vehicle passes over it. The ultimate result is a punched paper tape which must be translated and then the previous reading manually subtracted to yield a count for a given time interval. An example of event loggers utilizing these methods may be seen in the traffic flow counters currently employed by state highway departments to record traffic flow on selected streets. These counters are a combination of mechanical totalizer and a punched paper tape to represent the total cumulative count at specific time intervals. Such machines are quite bulky and heavy and operated poorly in low temperatures thereby severely limiting their usefulness.

SUMMARY OF THE INVENTION

Accordingly, it is an object of this invention to provide an event logger which is small and utilizes simplified techniques to replace more expensive and less efficient devices such as time clocks, mechanical counters and the like.

A further object is to provide an event recorder for simultaneously recording two related items of data or events on a single length of recording tape.

A further object of this invention is to provide a continuous time base for event recording, thus permitting a high degree of flexibility in data analysis procedures.

A still further object is to provide an event logger which records the occurrence of events on a tape medium which may be directly coupled to a digital computer such as a mini-computer thus permitting high speed playback or reconstruction of the data at time compression ratios as high as one thousand to one.

A still further object of this invention is to provide an event logger utilizing techniques which enables the logging of many events on a single length of standard magnetic tape. This high density capability may thus be utilized to provide a long time duration recording.

A further object of the invention is to provide a recording system which moves the tape at a fixed rate of speed, thus yielding a time coherent record of the data to permit analysis in the form of a time vs density graph or histogram.

A further object of this invention is a unique tape drive which eliminates conventional flywheels and power transfer components, by utilzing a direct friction drive of the tape from the output shaft of a gearbox hysterisis synchronous motor. The gearbox permits drive speeds as low as 0.001 inches per second, while the synchronous motor assures a stable and predictable tape velocity.

It is a further object to present a tape moving mechanism of simplified design for the purpose of manufacturing at lower cost.

Another object of the invention is to provide an event logger having minimal training requirements and controls thus enabling the logger to be used by unskilled personnel.

A feature of the invention is the provision of a sensor conditioning amplifier to permit use of the event logger with a wide variety of input sensors such as, for examples, a load cell responsive to weight changes, a photoelectric cell responsive to changes in light intensity, a contact closure such as a relay or a mechanical contact on a machine, a microphone responsive to acoustic sound energy, a magnetic pickup responsive to magnetic fluctuating fields, ultrasonic alarms or burgler alarm systems and/or other sensors as may be applicable.

A further feature in the preferred embodiment of the invention is a pulse rejection timer circuit which is responsive to the onset or occurrence of the event being monitored after which the logger will no longer be responsive to additional pulses until a specific length of time has elapsed following the event. Said pulse rejection timer thus eliminates the possibility of logging erroneous or excessive events which occur rapidly due to fluctuations in the condition being sensed such as bouncing of a mechanical contact which would give a multiple event indication if this condition was not rejected.

In accordance with the invention, there is provided an event logger including means for receiving a tape cartridge having a two track tape and a metallic arm pivotally mounted at one end and mounting a recording head, a post to serve as a handle, and tape pinch roller. The arm is adapted to be pivoted to a position to permit the engagement of the recording head with the magnetic tape while moving the pinch roller into operative engagement with the tape thereby eliminating other costly mechanical contrivances which are normally used to bring the recording head and tape into proximity with each other. The head is coupled to suitable circuits for recordiing data representative of the relative time between events on the two tracks respectively. At least one of the circuits includes an effective current reversal flip/flop.

A feature of the invention is the provision of a mechanical interlock to prevent the tape drive from being engaged unless a cassette is properly aligned when installed, A further feature of the invention is the use of a direct shaft drive to impart a forward motion to the tape. The direct drive has no resilient or compliant components and provides a rigid drive system which is necessary to maintain a uniform tape velocity at the extremely low velocities which must be employed to provide a long time base recording.

An application of this invention is to record employee badge numbers along with the time and number of events, for example, in a blueprint machine. In order to activate the blueprint machine, it is necessary to first insert the card, having a hole pattern denoting his employee number. This may be recorded in a self clocking code on one track of the tape, while each print made will be recorded by a flux reversal on the second track of the tape.

Further and other objects and advantages of the invention will become more apparent in the detailed description of the preferred embodiment presented below.

BRIEF DESCRIPTION OF THE DRAWINGS

In the detailed description of the preferred embodiment of the invention to be presented below, reference will be made to the FIGURES of the accompanying drawings in which.

DESCRIPTION OF THE PREFERRED EMBODIMENT

The preferred embodiment of the invention is disclosed in connection with an event logger system. It will be understood that non-essential mechanical features such as attachments and mounting fixtures have been eliminated for purposes of clarity. It should be further understood that inasmuch as the invention is applicable to the logging or recording of a wide variety of events, the tape velocity and therefore the maximum rate of occurrence of the events being monitored is a variable. Events which occur rapidly, that is in fractional parts of a second, would require a relatively high tape velocity to permit the discrimination of the individual events when playing the tape back. On the other hand, events which occur at much slower rates, for example, an interval not in excess of one per second will permit the use of extremely low tape velocities thus permitting an extended period of time recording. In the preferred embodiment as described, resolution of events on the order of one event per half-second have been realized utilizing commercially available tape having mylar for the tape backing, at a tape velocity of 0.001 inches per second. Performance testing of apparatus in accordance with the invention indicates that densities in the order of 1,000 flux reversals per inch are attainable with commercially available tape and recording heads. This permits a total recording time in excess of 17 days utilizing a standard magnetic tape cassette having a two track tape.

Figure 1:
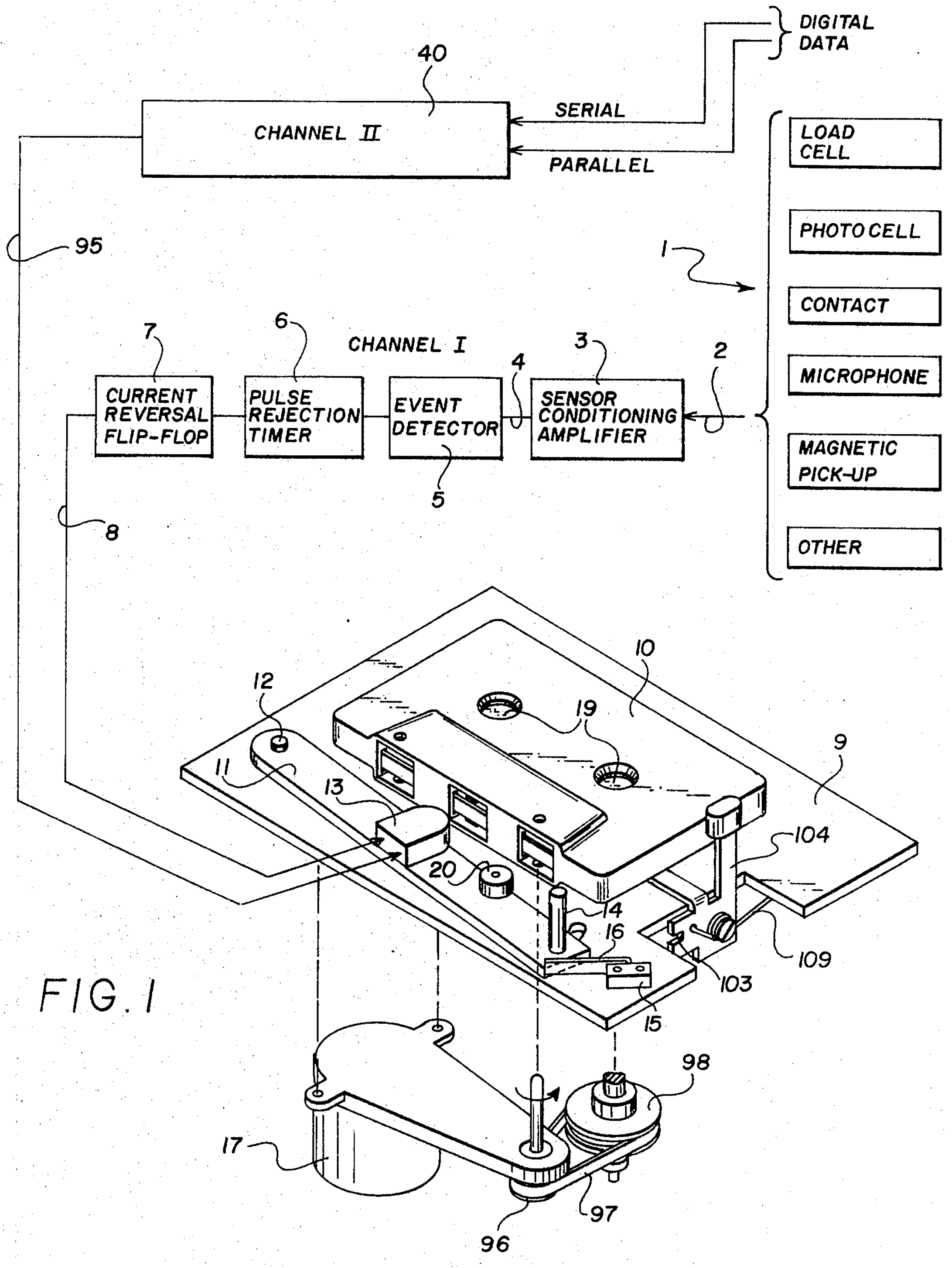
FIG. 1 is a schematic showing of an electrical block diagram and mechanical apparatus of an event logger in accordance with the invention.

It will be noted in FIG. 1 that there are two electric circuits labeled Channel I and Channel II respectively. Channel I is for recording input analog information and Channel II is for recording input digital information in either serial or parallel form. Any combination of channels may be utilized in accordance with the invention. For a specific example, you could have a logger which utilized two channel II tracks.

In the functional block diagram (FIG. 1) and referring in particular to the electronic portions of such Figure Labeled Channel I, there is shown a plurality of input sensors 1, such as a load cell, a contact photocell and the like; any one of which may be connected to a common input line 2 providing an AC voltage input signal to sensor conditioning amplifier 3. The sensor conditioning amplifier 3 amplifies the level of the signal generated by the input sensor 1 to a suitable level to permit a decision to be made as to whether or not the desired event has occurred. The output of sensor conditioning amplifier 3 is connected by a wire 4 to the input of event detector 5. Event detector 5 has a specified threshold or level of decision. Thus, any signal applied to the event detector which does not meet or exceed the preset threshold will be ignored or will not cause the initiation of the recording process. On the other hand, any signal caused by some physical phenomenon which creates a sufficient level of signal to meet or exceed the threshold set for the event detector will cause the generation of an output pulse. This output pulse is applied to pulse rejection timer circuit 6. Since the basic events being monitored are, for the most part, physical phenomenon in accordance with the invention, it is assumed that there may be rapid fluctuations or variations in the particular parameter being monitored, for example, light intensity. These fluctuations or variations in light intensity could cause a series of closely spaced pulses to be generated by the event detector. In the event the light fluctuations caused the level of signal to alternately exceed and then fall below the desired threshold, the resulting train of pulses from event detector 5, if not discriminated against, would cause a series or multiple number of events to be recorded thus causing an error in the determination of the total number of events which had occurred. It has been found preferable to have the timer circuit 6 in the form of one shot multivibrator 6 used to generate individual pulses rather than a timer circuit which produces a pulse train. Pulse rejection timer 6 then operates in a manner to effectively suppress rapid trains of pulses by requiring a specific time interval during which no event occurs before a new event may be recorded.

This time interval may easily be made adjustable and may be determined to be of a length commensurate with the fluctuations anticipated in the particular application of the invention.

It should be understood that the output of the pulse rejection timer 6 could be effectively recorded in its present form, that is the occurrence of an event could be utilized to cause the change of the magnetic state of the material on the tape and the removal or end of the pulse from the pulse rejection timer could then return the magnetic tape to its normal condition. A distinct disadvantage of this method is the requirement for two complete reversals of the magnetic flux. Inasmuch as the tape is moving at an extremely low velocity, the wave length between flux reversals is extremely small and will cause a cancellation of the previous reversal. That is, each subsequent reversal of the flux will have a demagnetizing effect upon the flux reversal which had just preceded it.

It is therefore an important feature of this invention that a current reversal flip/flop 7 has been incuded to cause a reversal of the current and therefore the magnetic flux state at only the onset or occurrence of each event being monitored. Current reversal flip/flop 7 is sensitive to and therefore, only operative to the onset or beginning of the current pulse appearing at the output of pulse rejection timer 6. It ignores or does not change state on the trailing or concluding edge of pulse rejection timer output, therefore effectively dividing the required density of information on the tape by a factor of 2. This doubling of the effective wave length eliminates the pulse crowding or partial erasure which would otherwise occur when attempting to record short wave length magnetic state transitions. This effectively permits doubling the amount of data which may be recorded on a given amount of magnetic tape medium, irrespective of the tape velocity in use.

This feature permits the doubling of the effective tape capacity, to wit, to provide twice the length of recording time on a given length of tape when compared to conventional recording methods. The output of current reversal flip/flop 7 is connected via wire 8 to a recording head 13 on the mechanical assembly. This recording head 13 is effective in converting the current flow from the flip-flop into a change of the magnetic flux field at the gap or discontinuity on the face of the recording head, said gap being positioned in a direction perpendicular to the normal manner of tape. Restating the foregoing from a different point of view, the state of flip/flop 7 is recorded on the tape as a result of current flow through recording head 13. With each succeeding input signal burst, the resulting trigger pulse will change the state of the flip/flop, and thus reverse the direction of current flow through the winding of head 13. The resulting flux reversal recorded on the tape is therefore a permanent record of the occurrence of the event. A block diagram of suitable logic circuits for recording input digital data on the second track shown as 40 in FIG. 1 is disclosed in greater detail in FIG. 4 for operating the second track. This block is also labeled Channel II. Before the mechanical aspects of this invention or block 40 are discussed, the details of electronic circuits just described will be discussed.

Figure 2:
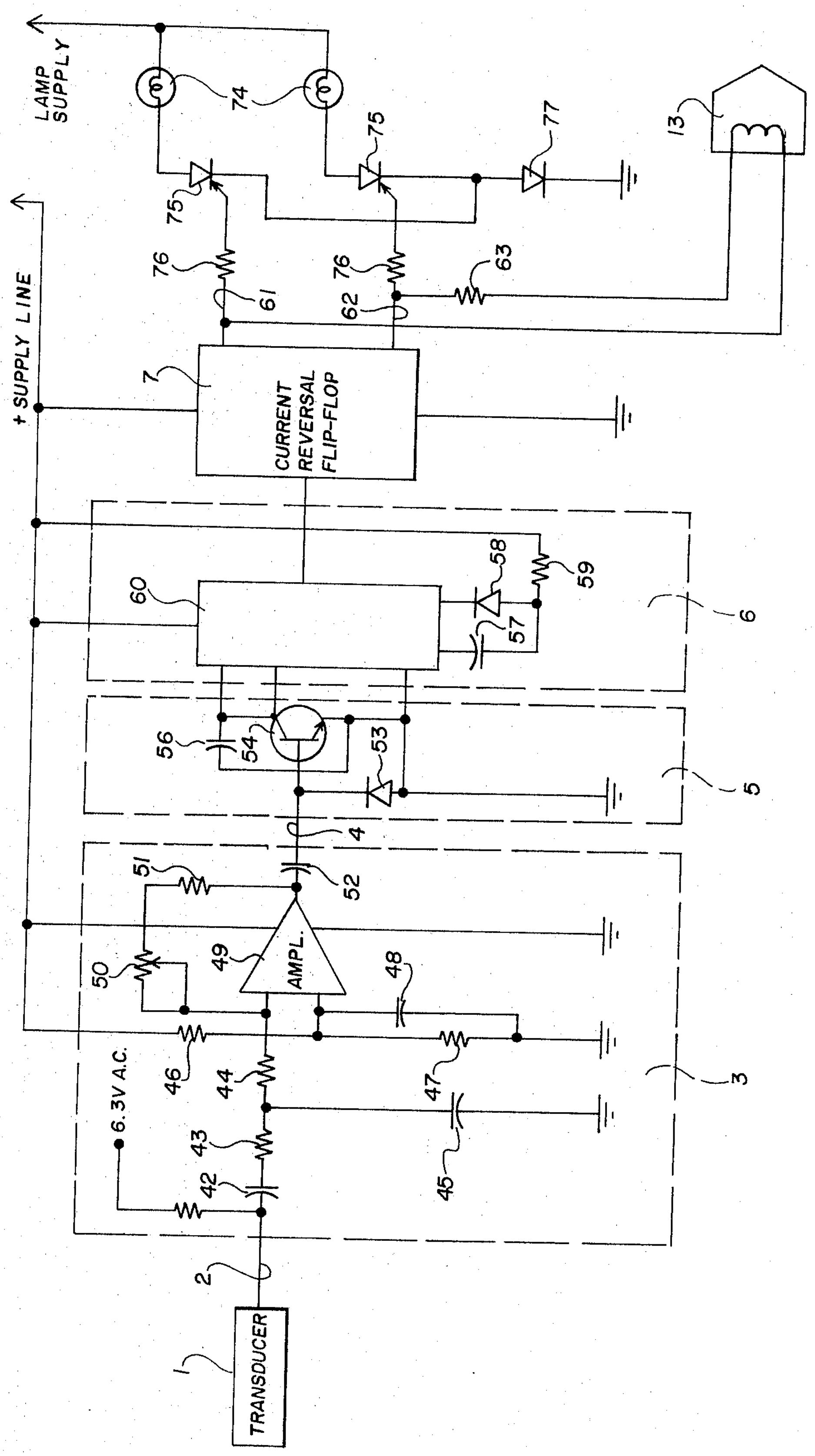
FIG. 2 is a schematic diagram of portions of the electronic circuitry shown in FIG. 1, labeled Channel I.

FIG. 2 is a detailed schematic diagram of the electronics used for Channel I. The AC signal produced by transducer 1 is applied via line 2 to signal conditioning circuit 3 having a capacitor 42, and a low pass filter consisting of resistors 43 and 44, and a capacitor 45. A DC bias of one-half of the supply voltage is found at the junction of the voltage divider comprised of resistors 46 and 47, and bypassed by a capacitor 48. This bias is applied to the + input of an operational amplifier 49. This establishes the DC operating level for operational amplifier 49. The gain of the amplifier 49 is controlled by a variable resistor 50 in a feedback circuit, with minimum gain limited by a resistor 51.

The amplifier output signal is coupled through a capacitor 52, to the event detector 5 which including a diode 53, and an NPN transistor 54. If the AC signal from the amplifier 49 exceeds the sum of the voltage drop across the diode 53, and the base voltage of transistor 54, then transistor 54 will conduct, falling to a low voltage state, triggering the pulse rejection timer circuit 6, which was previously described in the form of a multivibrator. Capacitor 56 is a bypass on the detector to prevent Radio Frequency Interference (RFI).

Timer 6 includes an integrated circuit 60 such as Model Number SN74122 manufactured by texas Instrument Corporation which can be reset to the start of its timing cycle by repeated application of the negative trigger. A capacitor 57, diode 58 and resistor 59 form a part of this circuit 6 and are selectable to define the time period thereof. This time period is sufficient to cover several cycles of the input signal thereby effectively converting the signal into a signal pulse, regardless of the length of the signal.

The output of timer 6 is a square wave pulse which is applied to the trigger input of the current reversal flip/flop 7. Each time a trigger pulse is applied, flip/flop 7 which reverses state. Current will flow from one output 61 to the other 62. The path for current flow is through the recording head 13 and through current limiting resistor 63. Each time flip/flop 7 changes state, the direction of current flow through the recording head 13 will be reversed. This reversal will result in a reversal of the magnetic flux being applied to the recording tape. An example of a commercially available current reversal flip/flop which has been found to perform satisfactorily in accordance with the invention is Model SN7470 manufactured by Texas Instrument Corporation.

In order to ascertain that Channel I for the first track is operating properly, circuitry for sake of clarity not shown in FIG. 1 is shown in FIG. 2 which includes a pair of indicator lamps 74 provided to indicate the state of flip/flop 7 as well as to serve as a pilot or power indicator since one or the other lamp 74 must be energized whenever power is applied. Since flip/flop 7 lacks sufficient current capability to drive the lamps directly, two Silicon Controlled Rectifiers 75 are used to drive the lamps. For whichever output 61 or 62 is in the high state, current will flow through one or the other of resistors 76, triggering that SCR into a conducting state. The lamp current must also flow through a diode 77 before going through such SCR. The resulting voltage drop is applied across the cathode of the non-conducting SCR to assure that it will not trigger until the proper signal is applied.

Figure 3:
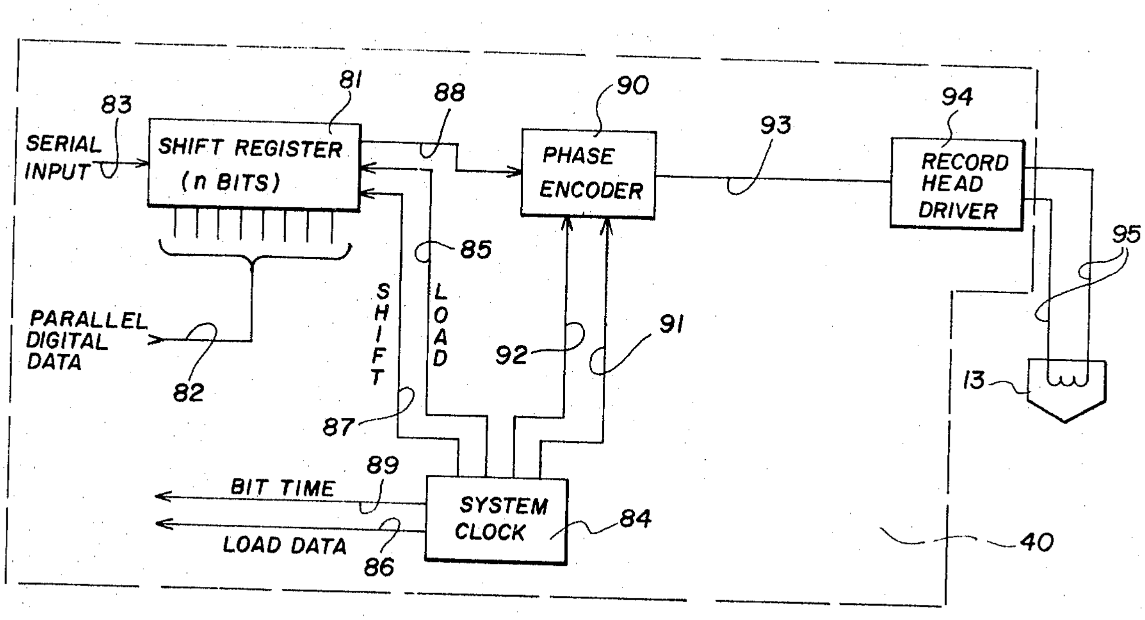
FIG. 3 is a detailed block diagram of digital data recording electronics shown in FIG. 1 and labeled Channel II.

Turning now to FIG. 3, electronics Channel II or block 40 for the second track is shown. The various functional elements of the block 40 are made up using integrated circuit elements such as the RCA 400 series COS/MOS elements. To cite an example, a shift register 81 could be made up of the CD4014, an eight bit parallel input serial output device. If any arbitrary number of bits $n$ desired is greater than eight, say 24 bits, then three CD4014 packages would be cascaded. Any further detailed implementation of the remaining stages of block 40 need not be presented, since such detail would be immediately apparent to one of ordinary skill in the art. The shift register 81 is used to store the desired incoming digital data and convert it to a serial format. Parallel data is applied at the input 82, and upon command by a system clock 84 via line 85, is entered into the memory elements in shift register 81. The load pulse is also applied via line 86 to the external data source to indicate that loading is taking place, and the data must not be changed during this time. The input serial or parallel data could come from an external badge reader or a time clock for a specific example.

After the loading interval, clock pulses at the desired recording rate are applied via line 87 to the shift terminal of the shift register 81. The data contained in the register 81 is progressively moved or shifted to the right causing a sequential appearance of the data pattern at output line 88.

The bit time, or shift pulses are also presented to the external data source by line 89 in order to synchronize such data source. With the external shift pulses, it is possible to operate using serial data at input line 83 providing the data is synchronized by using the pulses appearing at line 89 to keep the external data in step with the block 40 electronics.

As the data appears on the output line 88, it is introduced into phase encoder 90 along with a twophase bit rate clock via lines 91 and 92. The data is thereby converted to a self-clocking code known as bi-phase mark although not limited thereto. An example of such a phase encoder is disclosed in EDMAC U.S. Pat. No. 3,737,895.

The encoded data appears on line 93, and is applied to head driver 94. The head driver provides a constant current bipolar signal to the recording head 13 via lines 95 thus recording the data as a pattern of flux reversals on the magnetic tape.

Returning to FIG. 1 and also to FIG. 4, the mechanical apparatus will be described only insofar as is necessary to support the claims and features of the invention. Certain other mechanical appurtenances have been deleted for purposes of clarity; however, it will be understood by those skilled in the art that other mechanical supports and operating members will be provided to permit the effective assembly of the mechanical components and to permit a means of packaging the entire assembly into a suitable enclosure. The tape moving mechanism or transport is constructed on a base plate or chassis 9. This plate 9 supports through suitable attachments a tape cassette 10 which contains up to 300 feet of magnetic plastic film tape. The cartridge 10 is initially installed by positioning it over hubs 19 having suitable attachments to rotate the internal cartridge hubs thus moving the tape from one internal hub to another.

Located on the main chassis 9 in a position in front of but not in contact with the cassette or cartridge is a movable arm 11, pivotally mounted at one end by means of a fixed or rigid post 12. Also mounted on the movable portion on arm 11 is the recording head 13. The head 13 is positioned in such a manner that when the arm 11 is swung away from the cartridge 10, the head 13 will be completely removed from proximity with the tape. Likewise, when the arm 11 is swung to the forward position by means of an operating handle 14, the recording head 13 will be forced into close proximity with the tape, protruding into the cartridge 10 through the opening provided in the side of the cartridge. Handle 14 is thus used to engage or disengage the tape mechanism. A mechanically actuated switch 15 is mounted on the main chassis 9 in such a position that an actuating element 16 engages the switch 15 arm when the arm 11 is drawn to the retracted position. Thus, the actuating force for switch 15 is supplied by the pivot arm 11 in the act of withdrawing from the tape cartridge, and switch 15 is operated to the opposite state when pivot arm 11 is engaged. In this manner the operating force for switch 15 does not detract from the force applied to move the pivoted arm 11 into proximity with the tape cartridge.

The electrical contacts of switch 15 are utilized to control the electrical power supply which is operative to permit the functioning of both a drive motor and an integral gear box 17 and the power supply which supplies power to all of the electronic circuits in a manner well understood in the art. As a result, switch 15 fulfills the unique role of controlling the operation of the event logger system in such a manner that it is impossible to energize the equipment without having first placed the pivoted swing arm 11 into the proper engaging relationship with the tape cartridge 10. When so engaged, the recording head 13 is inserted into the tape cartridge in such a manner that removal of the tape cartridge is impossible. Therefore, it follows that removal of the tape cartridge is not possible until the pivoted arm 11 has been withdrawn or returned to its disengaged position, and this act also actuates switch 15 via actuator 16, thus de-energizing the logger prior to the removal of the tape cartridge. This effectively prevents an inexperienced operator from incorrectly operating the event logger and eliminates the possibility of the mechanism being in operation while the tape cartridge is being inserted or removed.

Figure 4:
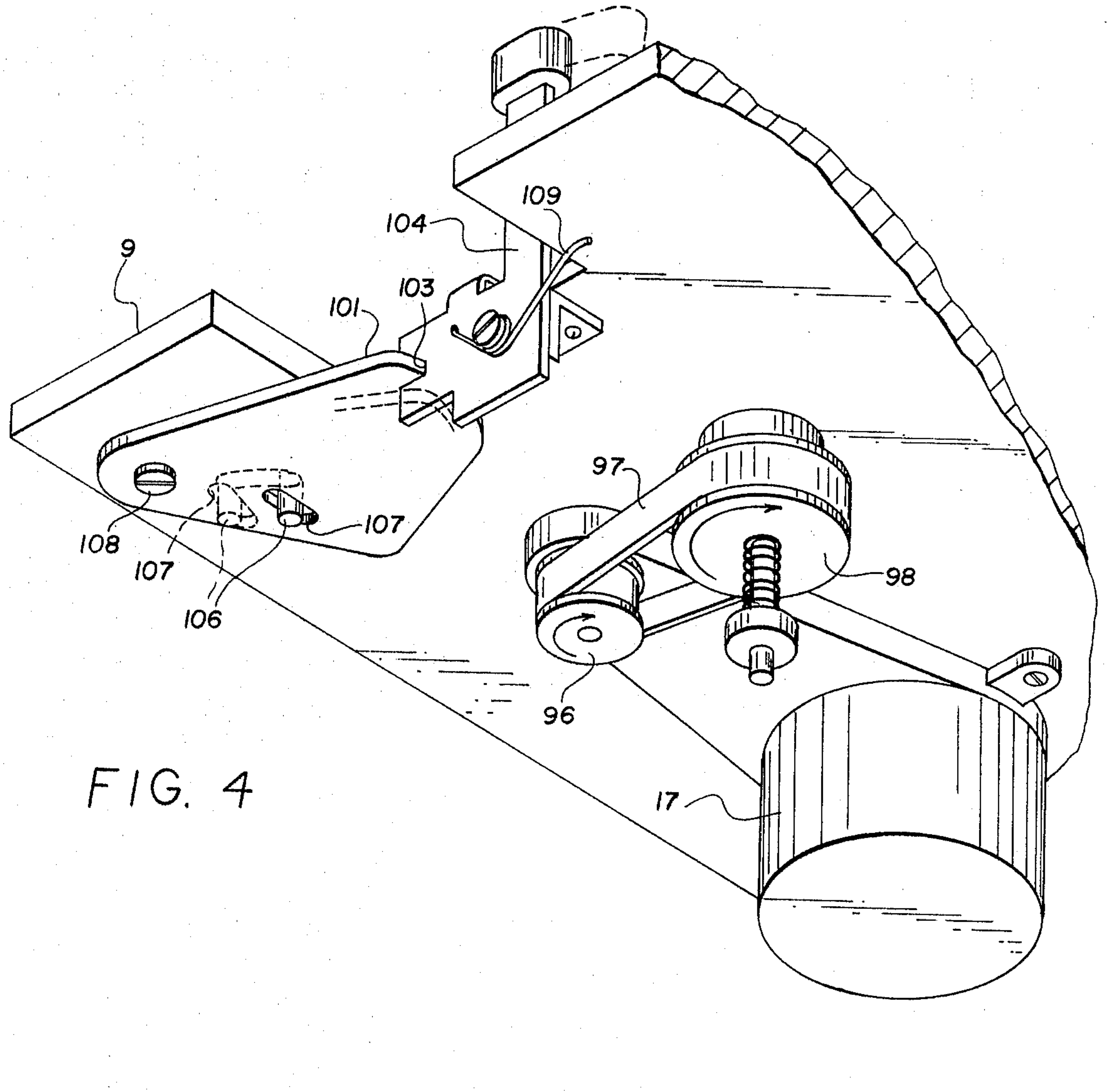
FIG. 4 is a bottom perspective view of the mechanical apparatus of FIG. 1 showing the details of an interlock mechanism in accordance with the invention.

Referring particularly to FIG. 4, a pulley 96 on the bottom end of the motor shaft drives the take-up hub 19 be means of a rubber belt 97 and slip clutch 98. The hub 19 engages the take-up hub (not shown) in the cassette 10. To facilitate removal of the cassette 10, a cassette eject lever 104 has been provided. The lever 104 has a portion extending under the cassette so as to force the cassette up when the eject lever is operated.

The electrical drive motor 17 is mounted on the underside of plate 9 in such a position that a shaft 18 protrudes upward through a hole in the plate 9 and into the suitable hole in the tape cartridge 10. Thus, when the pivoted arm 11 is placed in proximity to the tape cartridge, a roller 20 of resilient rubber material is caused to penetrate a suitable slot on the side of the tape cartridge, thereby pinching the tape between the pinch roller 20 and the shaft 18 which has been placed inside the tape cartridge 10. Such pinching action of the resilient rubber roller 20 imparts a frictional drive force upon the surface of the tape inside the cartridge, advancing it or forcing it to move in the direction determined by the shaft rotation. It will also be understood that a moderate rotating force is applied to the take-up hub 19 contained within the tape cartridge to reel or spool the tape into the take-up hub after the tape has been moved past the recording head 13. It is significant, however, that the tape motion is controlled at all times by the rotation of capstan shaft 18 and not by take-up hub 19, thereby providing precise control of the tape movement at an extremely low velocity. This is the reason for the slip clutch 98.

It is necessary to prevent damage to the mechanism which might be caused by operating the eject lever while the arm is engaged. An interlock 101 in the form of a special shape metal plate which is rotated when the arm 11 (FIG. 1) is engaged into such a position to enter a slot 103 on the eject lever 104 disposed below the main plate 9. The motion of the interlock plate 101 is imparted by an extension 106 of the actuating handle 14 (see FIG. 1). This extension 106 protrudes through a slot in main plate 9 and engages a slot 107 on the interlock plate 101.

I claim:

1. In an event logging system for recording digital data representative of events and including means for receiving a cassette including a continuously movable magnetic tape having recording track, the combination comprising:

a. actuable first channel means including a head and an analog circuit adapted to convert analog information into a format suitable for magnetic recording by said head, said channel means being effective when actuated for recording events on the track of said tape; said first channel means including:
   i. an event detector for producing electrical signals representative of events respectively;
   ii. a pulse rejector timer circuit coupled to said event detector for passing only one of said event signals for one detected event; and
   iii. a current reversal flip-flop coupled to said head and said timer circuit and responsive to the one processed event signal by said timer circuit to change the flip-flop state and record the one event;

b. switch means effective when moved to an operative position for actuating said channel means to cause said system to record data.

2. In an event logging system for recording digital data representative of events and including means for receiving a cassette including a continuously movable magnetic tape having a recording track, the combination comprising:

a. actuable first channel means including a head and an analog circuit adapted to convert analog information into a format suitable for magnetic recordings by said head, said channel measn being effective when actuated for recording events on the track of said tape, said first channel means including:
   i. an event detector for producing electrical signals representative of events, respectively;
   ii. a pulse rejection timer circuit coupled to said event detector for passing only one of said event signals for one detected event; and
   iii. a current reversal flip-flop coupled to said head and said timer circuit and responsive to the one processed event signal by said timer circuit to change the flip-flop state and record the one event;

b. switch means effective when moved to an operative position for actuating said channel means to cause said system to record data; and c. an interlock mechanism movable to a first position by an aligned cassette in said cassette receiving means to permit recording and movable to a second position to prevent the recording of information when a cassette is not properly aligned in said cassette receiving means thereby preventing damage to said system or inadvertent loss of data.

3. In an event logging system for recording by a head supported upon a pivotally mounted arm, digital data representative of events and including means for receiving a cassette including a continuously movable magnetic tape having first and second recording tracks, the combination comprising:

a. first actuable channel means including an analog circuit adapted to convert analog information into a format suitable for magnetic recording by said head on one of said tracks, said first channel means being effective when actuated for recording event information on said one track of said tape, said first channel means including:
   i. an event detector for producing electrical signals representative of events, respectively;
   ii. a pulse rejection timer circuit coupled to said event detector for passing only one of said event signals for one detected event; and
   iii. a current reversal flip-flop coupled to said head and said timer circuit and responsive to the one processed event signal by said timer circuit to change the flip-flop state and record the one event;

b. second actuable channel means including a shift register and being effective when actuated for recording digital input data on said second track;

c. means actuable by said pivotally mounted arm means when moved to said operative position to actuate said first and second channel means; and d. an interlock mechanism movable to a first position by an aligned cassette in said cassette receiving means to permit recording and movable to a second position to prevent the recording of information when a cassette is not properly aligned in said cassette receiving means thereby preventing damage to said system or inadvertent loss of data.

4. In an event logging system for recording digital data representative of events and including means for receiving a cassette including a continuously movable magnetic tape having first and second recording tracks, the combination comprising:

a. pivotally mounted arm means having a recording head and a pinch roller and being adapted to be pivoted from an inoperative to an operative position wherein said pinch roller engages said tape and said head is disposed in recording relation to said recording tracks;

b. first actuable channel means effective when actuated for being coupled to said head and including analog circuit adapted to convert analog information into a format suitable for magnetic recording by said head on one of said tracks, said first channel means being effective when actuated for recording event information on said one track of said tape, said first channel means including:
   i. an event detector for producing electrical signals representative of events, respectively;
   ii. a pulse rejection timer circuit coupled to said event detector for passing only one of said event signals for one detected event; and
   iii. a current reversal flip-flop coupled to said head and said timer circuit and responsive to the one processed event signal by said timer circuit to change the flip-flop state and record the one event;

c. second actuable channel means coupled to said head and including a shift register and being effective when actuated for recording digital input data on said second track;

d. switch means actuable by said pivotally mounted arm means when moved to said operative position to actuate said first and second channel means; and e. an interlock mechanism movable to a first position by an aligned cassette in said cassette receiving means to permit recording and movable to a second position to prevent the recording of information when a cassette is not properly aligned in said cassette receiving means thereby preventing damage to said system or inadvertent loss of data.

5. The invention as set forth in claim 4 wherein said first channel means includes means including a pair of indicator lamps for indicating the state of said current reversal flip-flop.

6. The invention as set forth in claim 5 wherein said second channel means includes a phase encoder coupled to said shift register and a system clock adapted to provide signals to said shift register and said phase encoder.

7. The invention as set forth in claim 6 wherein said phase encoder is adapted to record bi-phase mark data.

* * * * *